United States Patent [19]

Nakagawa

[11] Patent Number: 5,070,980
[45] Date of Patent: Dec. 10, 1991

[54] VISCOUS FLUID COUPLING

[75] Inventor: Makoto Nakagawa, Kariya, Japan

[73] Assignee: Aisin Seiki Kabushiki Kaisha, Kariya, Japan

[21] Appl. No.: 647,991

[22] Filed: Jan. 30, 1991

[30] Foreign Application Priority Data

Feb. 6, 1990 [JP] Japan .................................. 2-26848

[51] Int. Cl.$^5$ ............................................ F16D 31/00
[52] U.S. Cl. ................................. 192/58 B; 192/82 T; 123/41.12
[58] Field of Search .......................... 192/58 B, 82 T; 123/41.12

[56] References Cited

U.S. PATENT DOCUMENTS

| 4,064,980 | 12/1977 | Tinholt | 192/82 T X |
| 4,295,550 | 10/1981 | Hayashi | 192/58 B |
| 4,298,111 | 11/1981 | Hayashi | 192/58 B |
| 4,909,368 | 3/1990 | Hayashi | 192/58 B |
| 4,930,457 | 6/1990 | Tamai | 192/82 T X |
| 4,938,329 | 7/1990 | Kennedy | 192/58 B |
| 4,969,920 | 11/1990 | Kennedy | 192/58 B |
| 4,974,712 | 12/1990 | Brown | 192/82 T X |
| 4,979,601 | 12/1990 | Hagiwara et al. | 192/58 B |

FOREIGN PATENT DOCUMENTS

| 57-83728 | 5/1982 | Japan | 192/82 T |
| 62-194038 | 8/1987 | Japan | 192/58 B |
| 2071283 | 9/1981 | United Kingdom | 192/58 B |

Primary Examiner—Allan D. Herrmann
Assistant Examiner—Andrea Pitts
Attorney, Agent, or Firm—Oblon, Spivak, McClelland, Maier & Neustadt

[57] ABSTRACT

There is disclosed a thin and inexpensive viscous fluid coupling used to control the rotational speed of a fan for cooling an automotive engine. The coupling comprises a shaft, a housing rotatably held to the shaft, a cover mounted to the housing, a first and a second annular partition plates having communication holes, respectively, a valve for opening and closing the holes, and a rotor mounted to one end of the shaft. The housing and the cover together form an inside space which is divided into a storage chamber and a working chamber by the partition plates. The inside diameter of the first partition plate is less than that of the second partition plate. The communication holes are located on the same circumference, or the hole in the first partition plate is located radially outside the hole in the second partition plate.

5 Claims, 6 Drawing Sheets

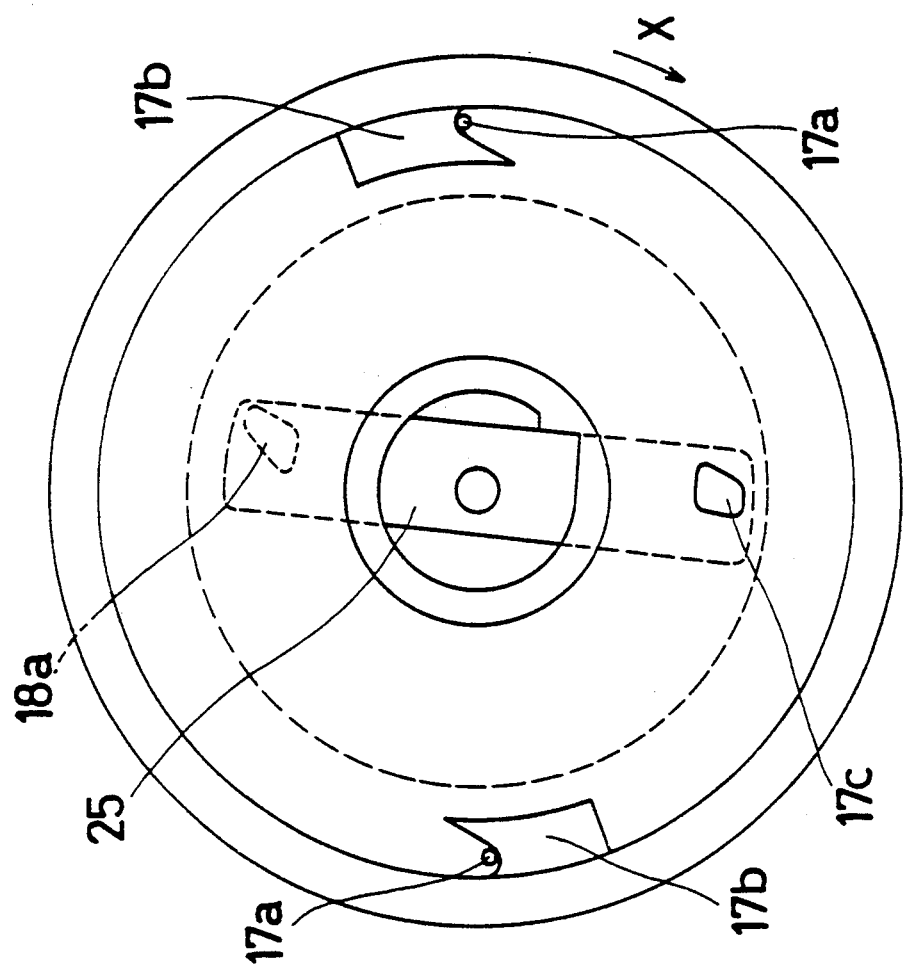
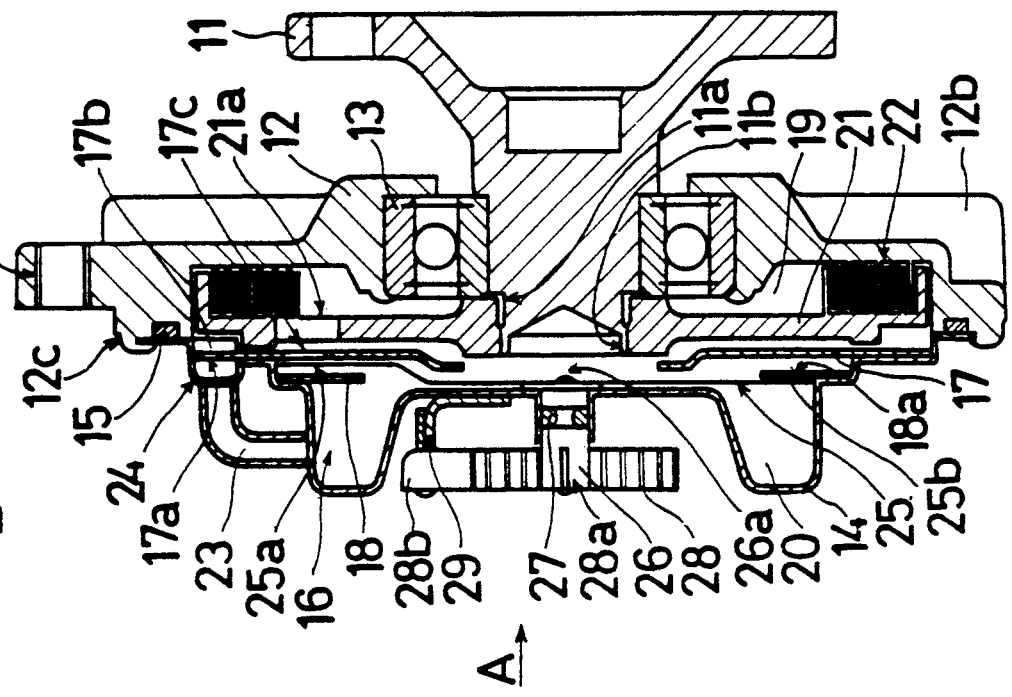

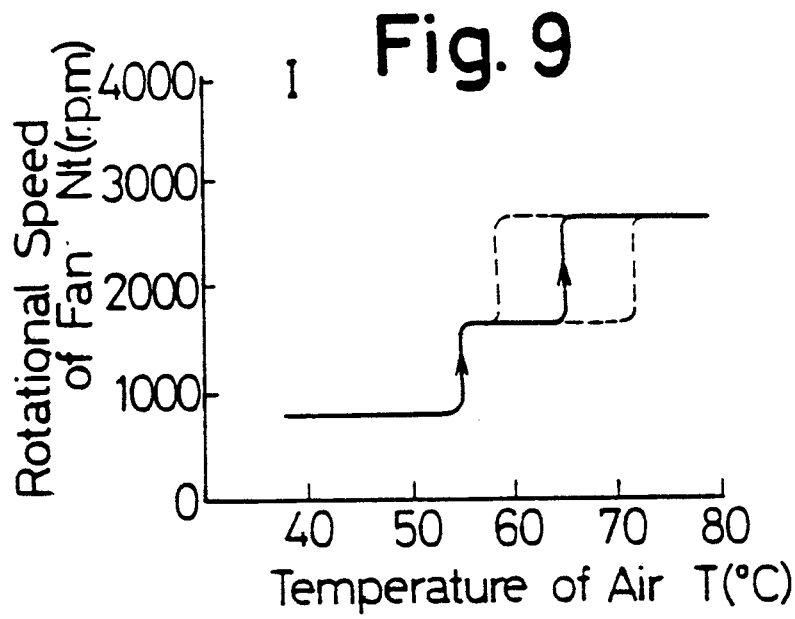
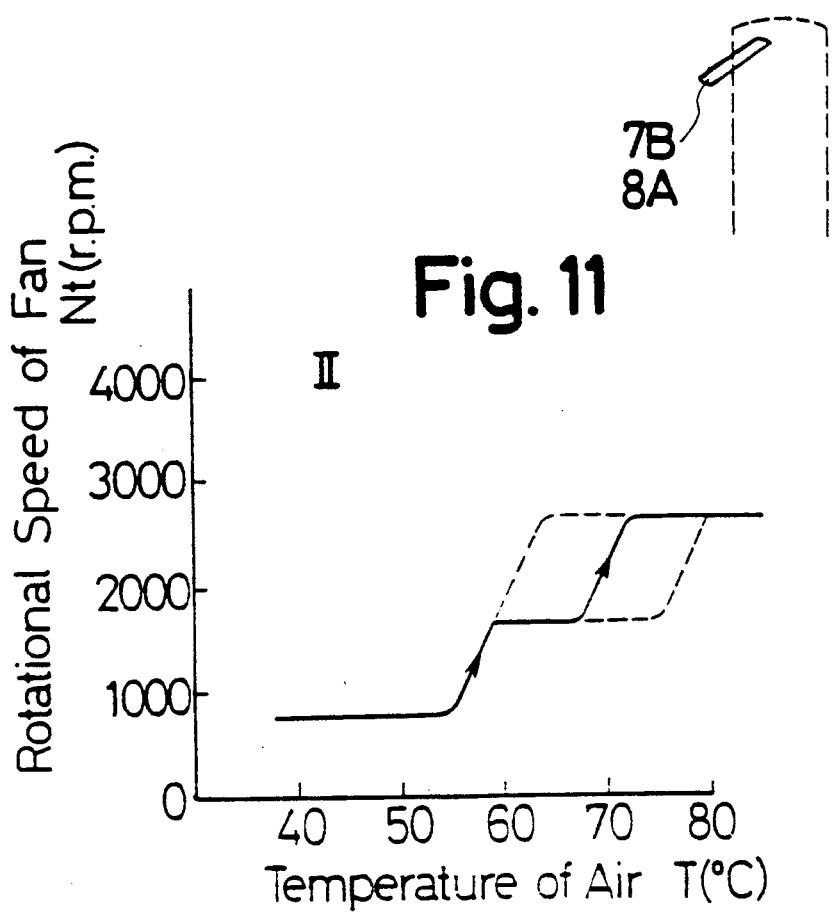

VISCOUS FLUID COUPLING

FIELD OF THE INVENTION

The present invention relates to a viscous fluid coupling which can be used to control the rotation of a fan for cooling an automotive engine, for example.

BACKGROUND OF THE INVENTION

Heretofore, various viscous fluid couplings have been proposed. In the viscous fluid coupling disclosed in Japanese Patent Laid-Open No. 69326/1980, labyrinth grooves are formed on both sides of the rotor, and two working chambers are formed. The partition plate is provided with two holes which place a storage chamber in communication with the working chambers, respectively.

The two holes are opened successively to supply the viscous fluid from the storage chamber into one working chamber and then into the other. This permits the viscous fluid coupling to be switched between three states, i.e., disengaged state, partially engaged state, and fully engaged state. Thus, the rotational speed of the fan rigidly mounted to the outer surface of the coupling can be switched between three different values. Therefore, where the fluid coupling is used to control the rotation of the fan for cooling an automotive engine, the fan is able to cool the engine in response to the temperature of the water cooling the engine.

In the conventional viscous coupling described above, the labyrinth grooves are formed in both side surfaces of the rotor, and the two working chambers are formed. Therefore, the inner surface of the housing and the flat plane of the partition plate are required to have grooves opposite to the labyrinth grooves. This leads to an increase in the manufacturing cost. In addition, it is necessary to fabricate the partition plate from aluminum by die-casting so that it can be cut. For this reason, this part is expensive to fabricate. Furthermore, the thickness, or axial dimension, of the viscous fluid coupling is large, because the labyrinth grooves are formed on both sides of the rotor. This is disadvantageous for installation on a vehicle.

SUMMARY OF THE INVENTION

It is an object of the invention to provide a viscous fluid coupling which has only one working chamber but can be switched between plural different states.

The above object is achieved in accordance with the teachings of the invention by a viscous fluid coupling comprising: a shaft; a housing rotatably held to the shaft; a cover fixedly mounted to the housing, the cover cooperating with the housing to form an inside space; an annular partition plate which divides the inside space into a storage chamber and a working chamber, the partition plate being divided into a first portion and a second portion which are arranged in line on opposite sides of the axis of the shaft, the inside diameter of the first portion being less than that of the second portion, the first and second portions being provided with a first and a second communication holes, respectively, the first and second communication holes being so located that they are located on the same circumference or the first hole is located radially outside the second hole; a valve means that opens and closes the first and second communication holes in the annular partition plate; and a rotor received in the working chamber and rigidly mounted to one end of the shaft.

In this viscous fluid coupling, the amount of the viscous fluid supplied into the working chamber from the storage chamber can be switched between plural different values. Consequently, the viscous fluid coupling can be switched between plural states in operation with the single working chamber.

Other objects and features of the invention will appear in the course of the description thereof which follows.

BRIEF DESCRIPTION OF THE DRAWINGS

FIG. 1 is a cross-sectional view of a viscous fluid coupling according to the invention;

FIG. 2 is a side elevation of the coupling shown in FIG. 1, as viewed from the direction indicated by the arrow A in FIG. 1, and in which the coupling is disengaged;

FIG. 9 is a graph similar to FIG. 8, but showing the fan rotational speed-air temperature characteristics of another viscous fluid coupling according to the invention;

FIG. 10 is a front elevation of communication holes which are modifications of the communication holes formed in the viscous coupling shown in FIG. 1;

. FIGS. 11–13 are graphs similar to FIG. 8, but showing the fan rotational speed-air temperature characteristics of other viscous fluid couplings according to the invention.

DETAILED DESCRIPTION OF THE INVENTION

Figure 4:
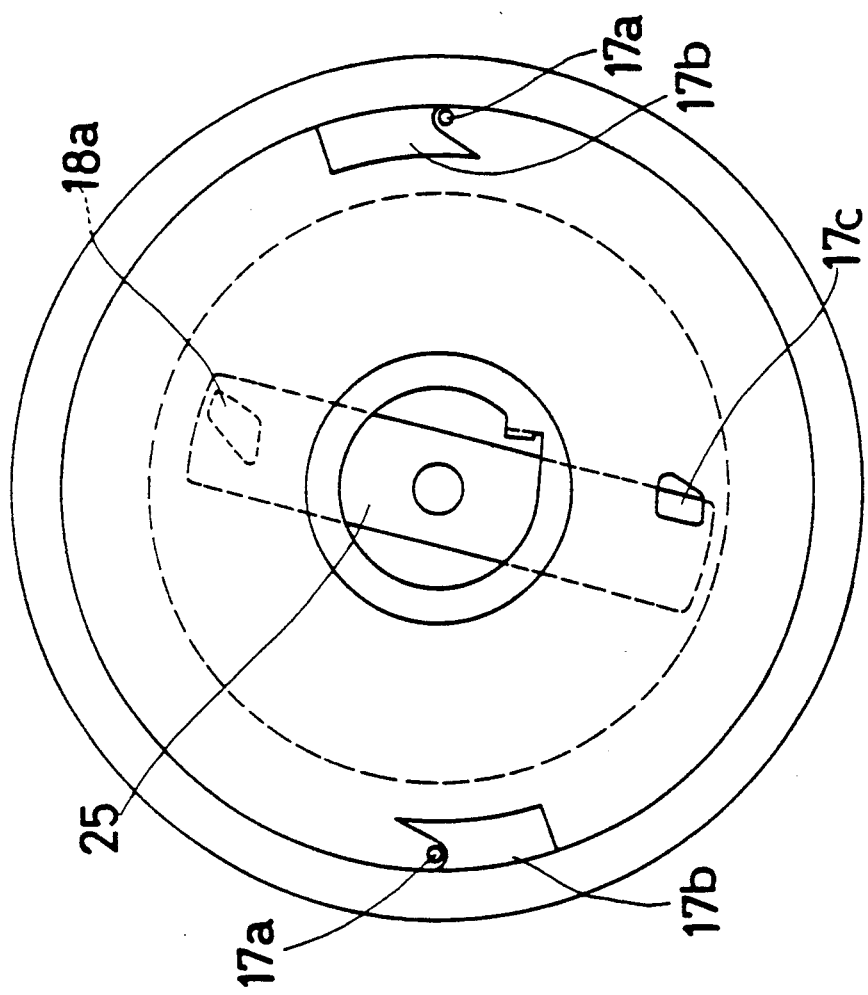
FIG. 4 is a side elevation similar to FIG. 2, but in which the coupling is partially engaged.

A viscous fluid coupling according to the invention is shown in cross section. The fluid coupling, generally indicated by reference numeral 10, comprises a shaft 11, a housing 12 rotatably held to the shaft 11 via a bearing 13, a cover 14, a rotor 21, and a valve 25 taking the form of a plate. One end of the shaft 11 is connected to a drive means (not shown) such that the shaft 11 can be rotated. An appropriate number of holes 12a are formed in the outer surface of the housing 12. A fan (not shown) is rigidly fixed in these holes 12a. A number of fins 12b are formed on one side surface of the housing 12.

The housing 12 is crimped at 12c such that the cover 14 is fixedly mounted on one side surface of the housing 12 via a seal member 15. The housing 12 and the cover 14 together form an inside space 16. A first partition plate 17 and a second partition plate 18 both of which are shaped into an annular form partition the inside space 16 into a working chamber 19 and a storage chamber 20. The outer peripheries of the partition plates 17 and 18 are firmly fixed to the cover 14.

The shaft 11 is crimped at 11b such that the rotor 21 is mounted to the other end of the shaft 11 via a spline 11a. The shaft 11 rotates with the rotor 21. Circumferentially extending labyrinth grooves 22 which are not in communication with each other are formed in the left side surface of the housing 11 and in the right side surface of the rotor 21, respectively.

The inside diameter of the annular first partition plate 17 is less than that of the annular second partition plate 18. The partition plates 17 and 18 are provided with circulation holes 17c and 18a, respectively. The radial distance between the axis of the shaft 11 and the circulation hole 17c is less than the radial distance between the axis of the shaft 11 and the circulation hole 18a. The rotor 21 is formed with a communication hole 21a to connect the left end surface of the rotor 21 with the right end surface. The communication hole 21a and the circulation hole 17c are located substantially on the same circumference.

Pump holes 17a are formed in the first partition plate 17 near its outer periphery. Pump protrusions 17b are formed on the partition plate 17 also near its outer periphery. A pump passage 23 which places the pump holes 17a in communication with the storage chamber 20 is fixedly mounted on the cover 14. A pump groove (not shown) is formed in the outer surface of the rotor 21. The pump holes 17a, the pump protrusions 17b, the pump passage 23, and the pump groove together form a pump mechanism 24. In FIG. 1, only one pump mechanism 24 is shown but two or more pump mechanisms may be provided. No limitations are imposed on the number of the pump mechanisms.

The valve 25 is crimped at its center against one end 26a of a rod 26 so that one end 25a of the valve 25 can open and close the circulation hole 17c and that the other end 25b can open and close the circulation hole 18a. The positions of the circulation holes 17c and 18a are so set that the hole 17c is opened earlier but closed later than the hole 18a.

The rod 26 is rotatably supported to the cover 14 via a seal member 27. The inner end 28a of a vortical bimetallic strip 28 is firmly fixed to the other end of the rod 26. The outer end 28b of the bimetallic strip 28 is rigidly fixed to a holder 29 that is welded to the cover 14. The inside of the working chamber 19 and the inside of the storage chamber 20 are sealed with a viscous fluid such as a silicone oil.

The operation of the viscous fluid coupling 10 constructed as described above is described now. The coupling 10 is used mainly to control the rotational speed of the fan for cooling an automotive engine. The coupling 10 is mounted behind the radiator (not shown) for the engine. When the engine was started just now and is not yet warmed up sufficiently, i.e., when the temperature of the coolant is low, the air passed through the radiator has a low temperature. In this state, the bimetallic strip 28 performs no function. The valve 25 closes both circulation holes 17c and 18a. This condition is shown in FIG. 2.

Figure 3:
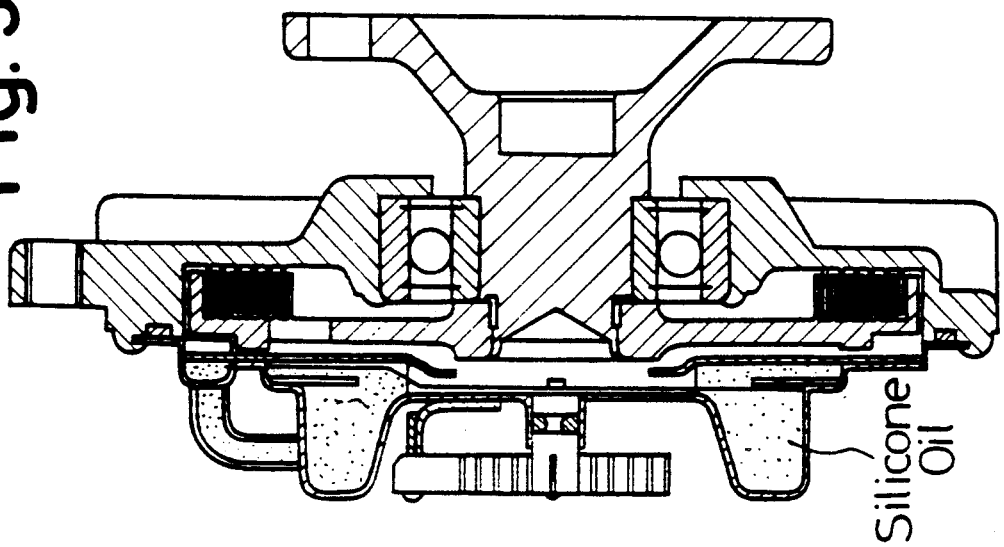
FIG. 3 is a view similar to FIG. 1, but in which the coupling is disengaged.
Figure 8:
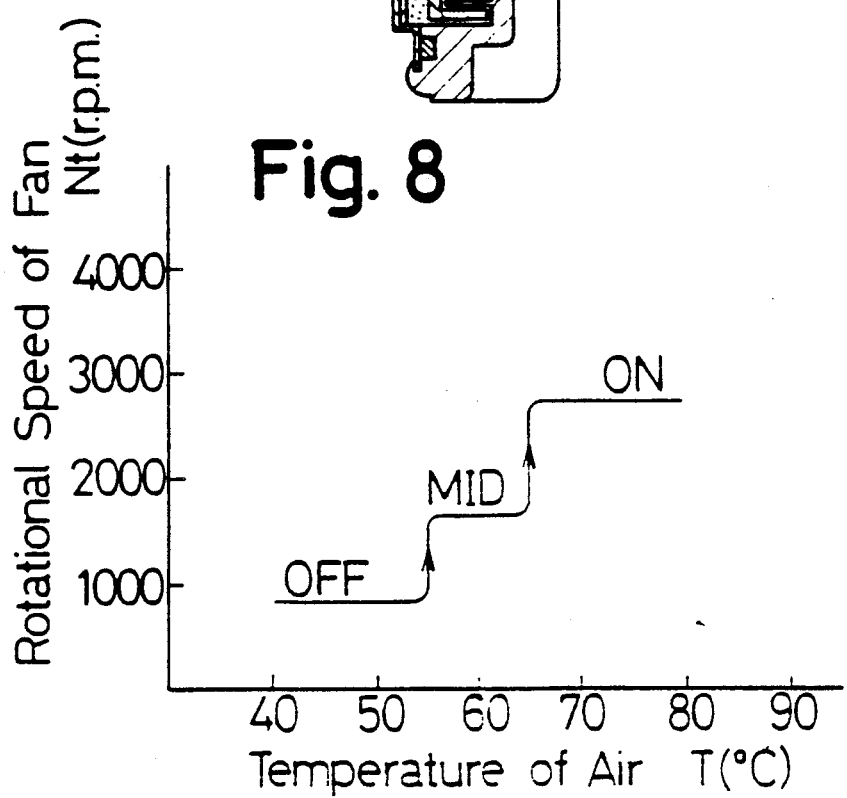
FIG. 8 is a graph in which the rotational speed of a fan is plotted against the temperature of air in front of a bimetallic strip included in the viscous fluid coupling shown in FIG. 1.

At this time, the rotor 21 rotates with the shaft 11 driven by the engine and so almost all the viscous fluid in the working chamber 19 is returned to the storage chamber 20 by the action of the pump mechanism 24. This condition is shown in FIG. 3. Therefore, only a small amount of viscous fluid remains in the labyrinth grooves 22. Since weak torque is transmitted from the rotor 21 to the housing 12, the rotational speed of the fan mounted on the housing 12 is low. This condition is shown in FIG. 8 and designated OFF, i.e., the coupling is disengaged.

As the temperature of the coolant cooling the engine rises, the temperature of the air passed through the radiator also rises. The valve 25 is gradually rotated in the direction indicated by the arrow X in FIG. 2 by the action of the bimetallic strip 28. The valve 25 first opens only the circulation hole 17c. This condition is shown in FIG. 4.

Figure 5:
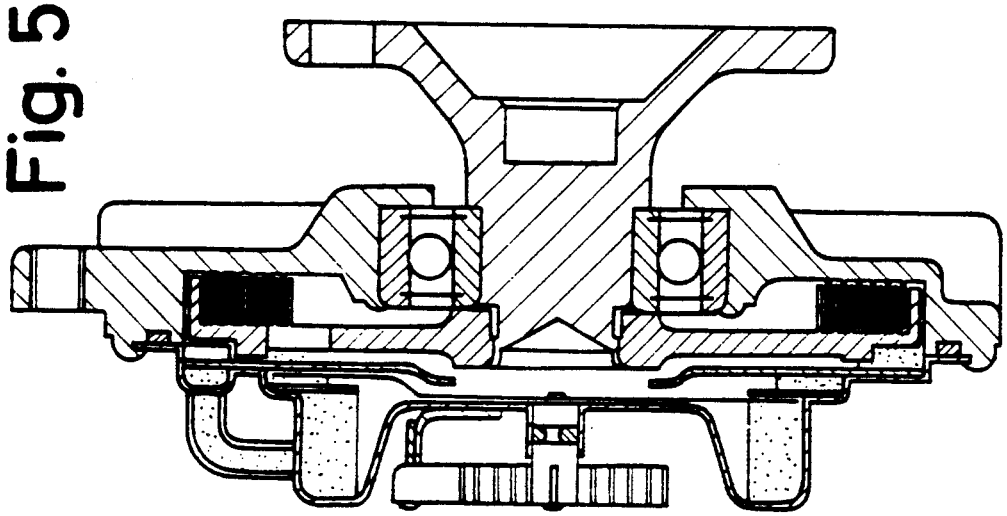
FIG. 5 is a cross-sectional view similar to FIG. 1, but in which the coupling is partially engaged.

At this time, the viscous fluid in the working chamber 19 is forced back into the storage chamber 20 by the pump mechanism 24. On the other hand, the viscous fluid in the storage chamber 20 flows out into the labyrinth grooves 22 in the working chamber 19 through the circulation hole 17c and the communication hole 21a. This condition is shown in FIG. 5. That portion of the viscous fluid which exists inside of the inner surface of the second partition plate 18 is always supplied into the labyrinth grooves 22. Torque of the strength corresponding to this amount of fluid is transmitted from the rotor 21 to the housing 12. As a result, the fan turns at a given frequency. This condition is shown in FIG. 8 and designated PAR, i.e., the coupling is partially engaged.

Figure 6:
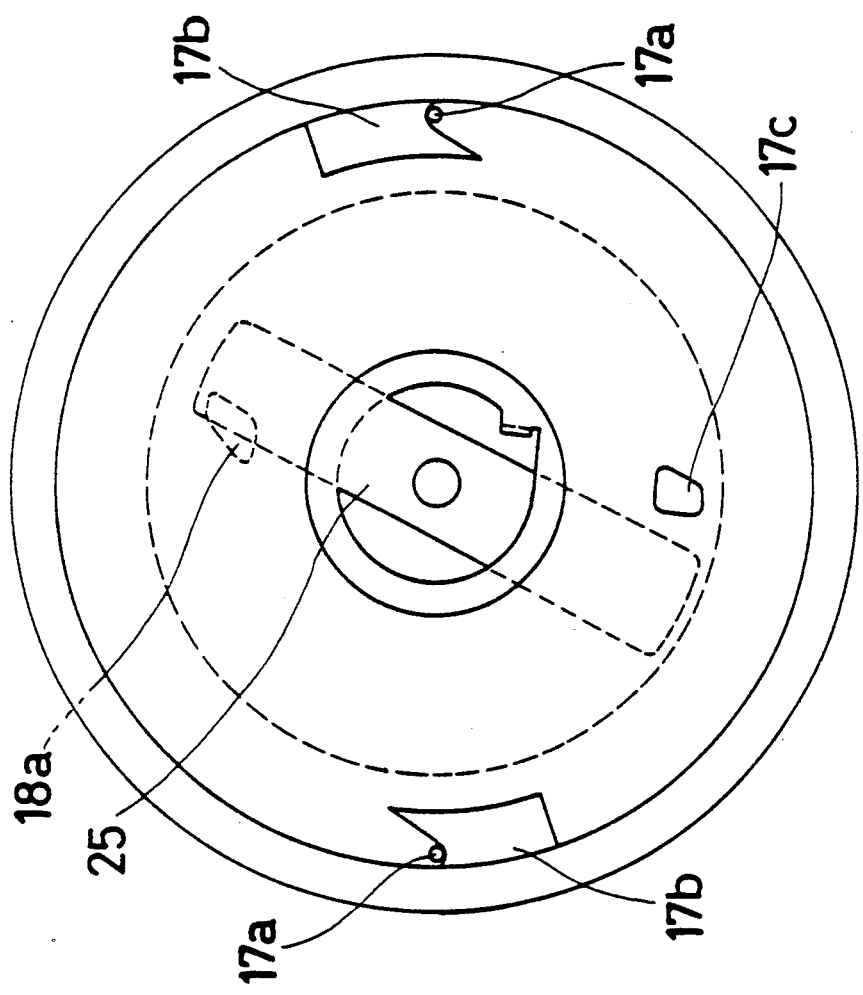
FIG. 6 is a side elevation similar to FIG. 2, but in which the coupling is fully engaged.

As the temperature of the coolant that cools the engine rises further, the temperature of the air passed through the radiator is also elevated further. The bimetallic strip 28 slowly rotates the valve 25 in the direction indicated by the arrow X in FIG. 2. The valve 25 fully opens the circulation hole 17c and then opens the circulation hole 18a. This condition is shown in FIG. 6.

Figure 7:
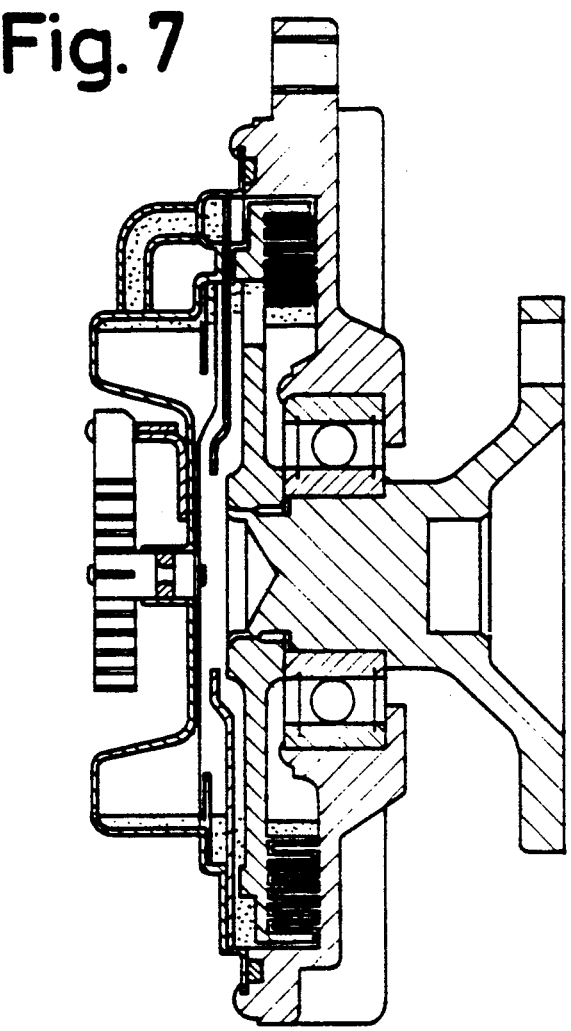
FIG. 7 is a view similar to FIG. 1, but in which the coupling is fully engaged.

At this time, the viscous fluid in the working chamber 19 is forced back into the storage chamber 20 by the pump mechanism 24. On the other hand, the viscous fluid in the storage chamber 20 flows out into the labyrinth grooves 22 in the working chamber 19 through the circulation holes 17c, 18a and through the communication hole 21a. This condition is shown in FIG. 7. Therefore, little viscous fluid stays in the storage chamber 20 but rather the fluid constantly flows into the working chamber 19. Thus, almost all the contained viscous fluid is constantly supplied into the labyrinth grooves 22. Torque of the magnitude corresponding to the amount of the supplied fluid is transmitted from the rotor 21 to the housing 12. As a result, the fan is rotated at a given frequency. This condition is shown in FIG. 8 and designated ON, i.e., the coupling is fully engaged.

In this way, the frequency of the rotation of the fan can be switched between three different values in response to the temperature of the air passed through the radiator, i.e., the temperature of the coolant cooling the engine.

The communication hole 17c formed in the first partition plate 17 forms an angle with the communication hole 18a formed in the second partition plate 18. This angle is determined when both partition plates 17, 18 are mounted on the cover 14. By setting this angle to an arbitrary angle during the manufacture of the viscous fluid coupling 10 the timing at which the coupling is switched from partially engaged state (PAR) to fully engaged state (ON) can be set arbitrarily as indicated by the broken lines in FIG. 9.

The communication holes 17c and 18a can be shaped into a form that changes gradually as shown in FIG. 10 such as a parallelogram. In this case, the rotational speed of the fan can be made to change linearly with the temperature detected by the bimetallic strip when the coupling is switched from disengaged state (OFF) to partially engaged state (PAR) or from partially engaged state (PAR) to fully engaged state (ON).

Figure 12:
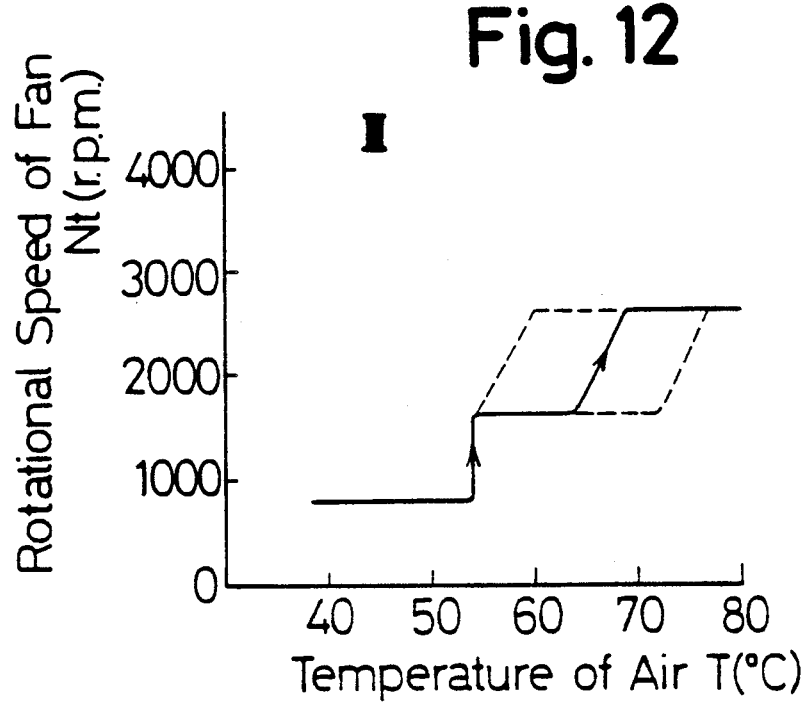
Figure 13:
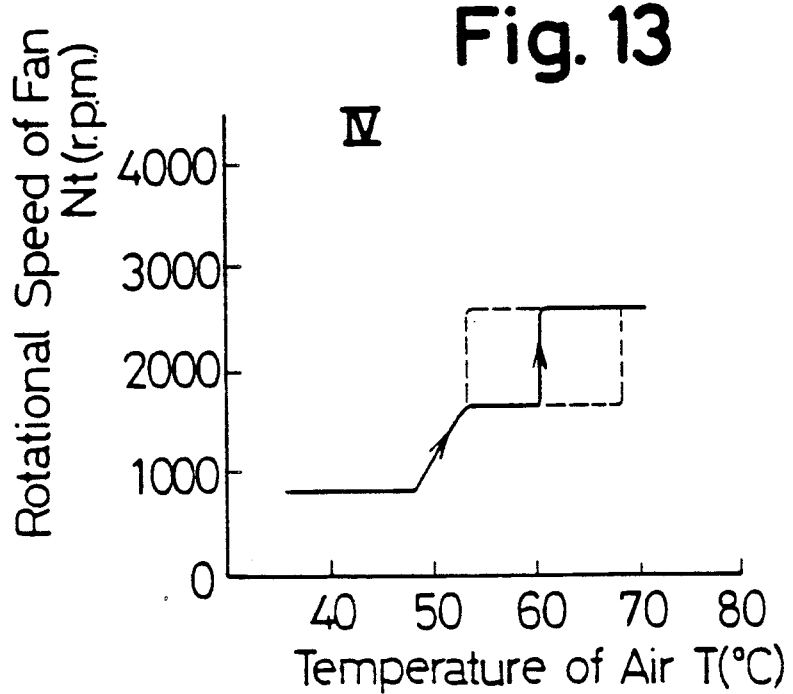

FIGS. 11-13 show the characteristics of fans controlled by other viscous fluid couplings having the communication holes 17c and 18a whose shapes are combinations of the normal shape shown in FIG. 2 and the gradually changing form shown in FIG. 10.

As described thus far, in accordance with the present invention, the amount of the viscous fluid supplied from the storage chamber into the working chamber is switched between the plural different values by the plural partition plates, though the labyrinth grooves are formed on only one side of the rotor. Consequently, the viscous fluid coupling can be switched between plural states in operation with the single working chamber.

What is claimed is:

1. A viscous fluid coupling comprising:
   a shaft;
   a housing rotatably held to the shaft;
   a cover fixedly mounted to the housing, the cover cooperating with the housing to form an inside space;
   an annular partition plate which divides the inside space into a storage chamber and a working chamber, the partition plate being divided into axially spaced first and second portions arranged adjacent a rotational axis of the shaft, the inside diameter of the first portion being less than that of the second portion, the first and second portions being provided with a first and a second communication holes, respectively, the first and second communication holes being so located one of a on circumferential line and on a radial line
   a valve means that opens and closes the first and second communication holes in the annular partition plate; and
   a rotor received in the working chamber and rigidly mounted to one end of the shaft.

2. The viscous fluid coupling of claim 1, wherein said valve means is so mounted as to open one of the communication holes earlier and close it later than the other.

3. The viscous fluid coupling of claim 1, wherein the first communication hole in the first portion of the partition plate makes an angle with the second communication hole in the second portion.

4. The viscous fluid coupling of claim 1, wherein said rotor has labyrinth grooves on its one side.

5. The viscous fluid coupling of claim 1, wherein said first and second communication holes in the partition plate are so shaped that a rotational speed of a fan controlled by the viscous fluid coupling changes linearly with temperature an air.

* * * * *